United States Patent
Tominaga et al.

(10) Patent No.: US 6,578,081 B1
(45) Date of Patent: Jun. 10, 2003

(54) SECURITY SYSTEM FOR ELECTRONIC INFORMATION SHARING

(75) Inventors: Hiroyuki Tominaga, Fukuoka (JP); Yoshiharu Sato, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/373,165

(22) Filed: Aug. 12, 1999

(30) Foreign Application Priority Data

Aug. 27, 1998 (JP) .......................... 10-241631

(51) Int. Cl.[7] .............................. G06F 13/00
(52) U.S. Cl. ..................... 709/229; 709/225; 713/201; 707/9
(58) Field of Search ............... 709/229, 225; 713/201, 200; 707/9

(56) References Cited

U.S. PATENT DOCUMENTS

| | | | | |
|---|---|---|---|---|
| 5,220,604 A | * | 6/1993 | Gasser et al. .................. 707/9 |
| 5,627,967 A | * | 5/1997 | Dauerer et al. ............. 713/202 |
| 5,737,523 A | * | 4/1998 | Callaghan et al. .......... 713/201 |
| 5,838,911 A | * | 11/1998 | Rosenhauer et al. ........ 709/203 |
| 6,092,201 A | * | 7/2000 | Turnbull et al. ............ 713/201 |
| 6,105,027 A | * | 8/2000 | Schneider et al. ............. 707/9 |
| 6,182,227 B1 | * | 1/2001 | Blair et al. .................. 713/201 |
| 6,219,786 B1 | * | 4/2001 | Cunningham et al. ...... 713/152 |

FOREIGN PATENT DOCUMENTS

JP 09185541 4/1994

* cited by examiner

Primary Examiner—Kenneth R. Coulter
(74) Attorney, Agent, or Firm—Katten Muchin Zavis Rosenman

(57) ABSTRACT

A security system ensures the security of electronic information shared among a plurality of companies by restricting the accessible range of the electronic information depending on the managing level of a user who accesses the electronic information. When a requester makes a request for sharing electronic information, the system acquires the managing level of the requester from user data, finds a tenant to which the requester belongs from tenant data, and provides the requester with a list of users who belong to the tenant to which the requester belongs.

7 Claims, 16 Drawing Sheets

Fig.2

| FILE | SHARING USER |
|---|---|
| FILE a | USER A2 |
|  | USER B1 |
| FILE b | USER A3 |
|  | USER C1 |
| FILE c | USER A1 |
|  | USER A2 |
|  | USER A3 |
|  | USER B1 |
|  | USER C1 |

Fig.5

| USER | MANAGING LEVEL |
|---|---|
| USER A1 | SYSTEM MANAGING USER |
| USER A2 | GENERAL USER |
| USER A3 | TENANT MANAGING USER |
| USER B1 | GENERAL USER |
| USER C1 | GENERAL USER |

Fig.6

| TENANT | USER |
|---|---|
| TENANT A | USER A1 |
| | USER A2 |
| | USER A3 |
| TENANT B | USER A2 |
| | USER A3 |
| | USER B1 |
| TENANT C | USER A3 |
| | USER C1 |

SECURITY SYSTEM FOR ELECTRONIC INFORMATION SHARING

BACKGROUND OF THE INVENTION

1. Field of the Invention

The present invention relates to a system for sharing electronic information through a programmed computer, and particularly, to a security system for electronic information shared among employees of different companies.

Improvements in computer networks are expanding the sharing of electronic information from among sections of the same company to among different companies. It is required to ensure the security of information shared among users and of the data about the users themselves.

2. Description of the Related Art

In this specification, a "requester" is a user who makes a request for sharing electronic information such as files. Through the accompanying drawings, like parts are represented with like reference marks. FIG. 1 shows a security system for shared electronic information according to a prior art. An input unit 21 and an output unit 22 are connected to a user interface 23 directly or through a LAN. A message entered by a requester into the input unit 21 is transferred to an objective unit through the user interface 23. The objective unit returns a reply, which is edited by the user interface 23 and the edited reply is transferred to the output unit 22. A user managing unit 24 manages data related to users, a user data manager 25 controls the data related to users, and a user level manager 26 determines the managing level of each user. Namely, the user level manager 26 determines whether or not a requester is a system managing user or a general user. User data 27 is in the form of a table. A sharing manager 28 manages users and electronic information shared by the users. Sharing data 29 is a list of electronic information and users that share the electronic information. An information manager 2A manages electronic information 2B. The electronic information 2B may be files, directories, or databases to be shared by users through networks.

The user data 27 is a database in the form of a table containing the names and managing levels of users.

FIG. 2 shows an example of the sharing data 29 containing the names of files and the names of users who share the files. In the example, there are three files a, b, and c. The file a is shared by users A2 and B1, the file b by users A3 and C1, and the file c by users A1, A2, A3, B1, and C1. When a requester enters a request for acquiring a list of users into the input unit 21, the user interface 23 transfers the request to the user level manager 26, which transfers the request to the user data manager 25. The user data manager 25 fetches a list of all users from the user data 27, and the user interface 23 transfers the list to the output unit 22. In this way, any requester can obtain a list of all users from the user data 27. When a requester, who is a user registered in the user data 27, enters a request for sharing the information 2B into the input unit 21, the user interface 23 analyzes the request and asks the sharing manager 28 to provide a list of users who share the information 2B. The sharing manager 28 returns the list, and the user interface 23 transfers the list to the output unit 22. Thereafter, the requester may select a user from the list on the output unit 22 and deletes, changes, or adds the selected user with respect to the information 2B. The information manager 2A and sharing manager 28 cooperate with each other to secure that only authorized users listed in the sharing data 29 access the information 2B.

If the user A1 of FIG. 2 makes a request for sharing the files a and b that are presently isolated from the user A1, the user A1 can get the names of the users A2 and B1 that are sharing the file a and the users A3 and C1 that are sharing the file b. This is because the prior art is based on a client-server system formed on an intranet whose extent is limited within an office in which there will be no problem even if every user looks in files and data about users. This, however, raises a security problem when information is shared by users belonging to different offices or companies through networks. It is necessary to limit the extent of information and user data to be retrieved by a user depending on a managing level given to the user.

According to the prior art, any registered user can retrieve a list of all users who share electronic information. Namely, the prior art allows each registered user to see a list of registered users, a list of electronic information, and a list of users who share the electronic information. This causes a problem when the electronic information is shared among companies that issue orders and companies that receive the orders.

SUMMARY OF THE INVENTION

An object of the present invention is to provide a system for ensuring the security of electronic information shared among companies and limiting the extent of electronic information and user data to be retrieved by a user depending on a managing level given to the user.

In order to accomplish the object, the present invention newly employs tenant data and a tenant data manager to provide a function of ensuring the security of user data. If a requester is a general user, the requester is allowed to refer to only data about users that are under a tenant to which the requester belongs and is prohibited from accessing data about users who are under tenants to which the requester does not belong. More precisely, the present invention provides a security system for electronic information sharing, having an input terminal with which a requester enters a request for sharing electronic information and an output terminal with which the requester receives a list of users who may share the electronic information. The security system is characterized by tenant data containing tenants and users belonging to the tenants and by a user-tenant managing unit for retrieving at least a tenant to which a requester belongs from the tenant data, preparing a list of users who belong to the retrieved tenant, and providing the requester with the prepared list through the output terminal.

The system also employs user data that contains users and managing levels related to the users. If the user data indicates that the requester is a system managing user, the user-tenant managing unit prepares a list of all users from the user data and provides the requester with the prepared list.

The system allows the system managing user to make deletion, updating, and addition with respect to the user data.

If the requester is a tenant managing user, the user-tenant managing unit retrieves at least a tenant to which the requester belongs from the tenant data, acquires a list of users who belong to the retrieved tenant from the tenant data, and provides the requester with the acquired list.

The system allows the tenant managing user to delete, update, and add data about the users who belong to the tenant to which the tenant managing user belongs.

The system also employs sharing data that specifies electronic information and users who share the electronic information. If the requester is a general user, the user-tenant managing unit retrieves at least a tenant to which the requester belongs from the tenant data and acquires a list of users who belong to the retrieved tenant from the tenant data. The system also employs a sharing manager that compares the acquired list with a list of users who share electronic information for which the requester issues the sharing request, and prepares a list of users who are present in both the acquired list and the list of users who share the electronic information. The lastly provided list is given to the requester.

BRIEF DESCRIPTION OF THE DRAWINGS

The present invention will be more clearly understood from the description as set forth below with reference to the accompanying drawings, in which:

FIG. 2 shows an example of a table of files and users who share the files;

FIG. 5 shows an example of user data in the system of FIG. 4;

FIG. 6 shows an example of tenant data in the system of FIG. 4;

DESCRIPTION OF THE PREFERRED EMBODIMENTS (1) Principle of Present Invention

Figure 1:
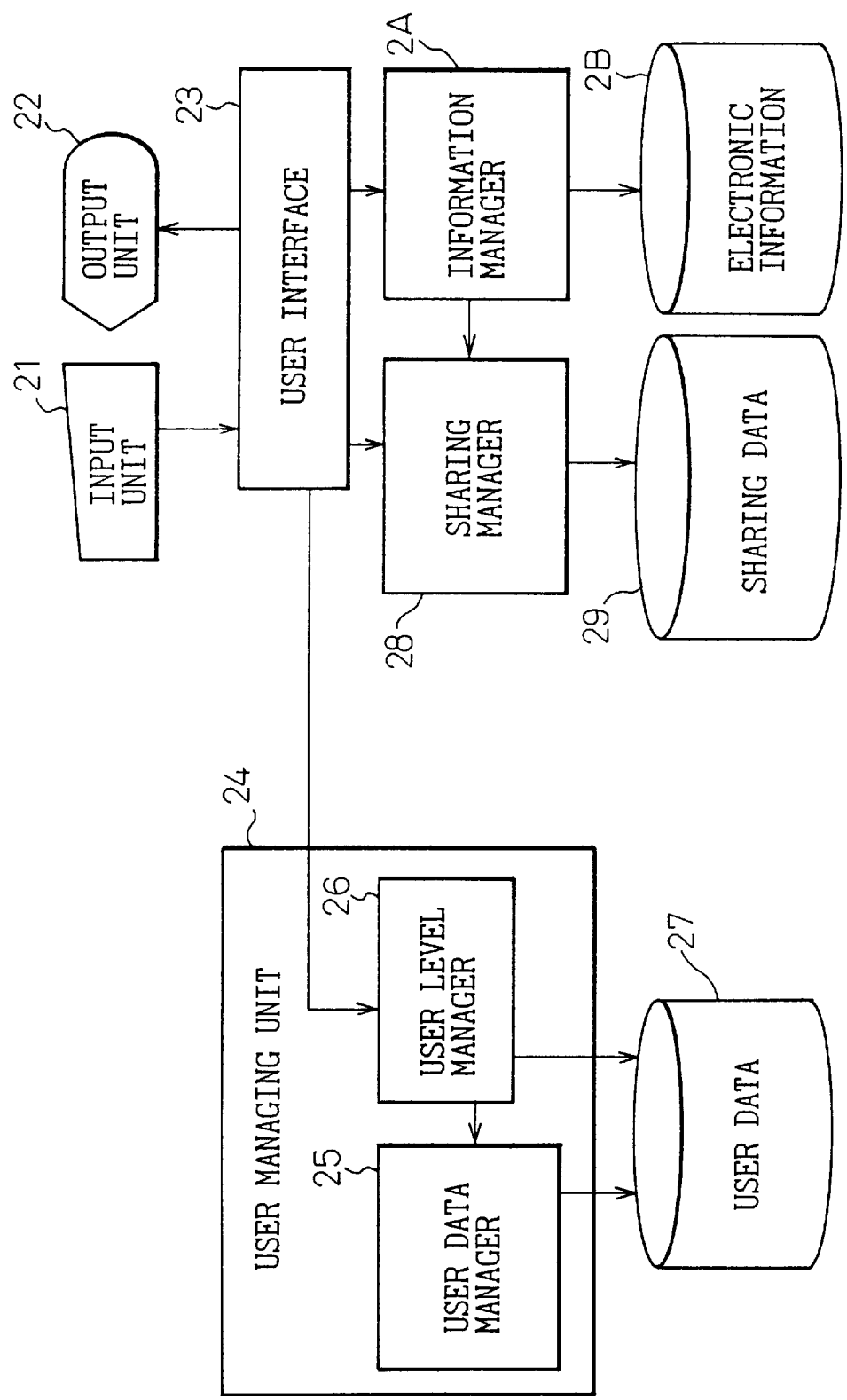
FIG. 1 shows a security system for shared electronic information according to a prior art.
Figure 3:
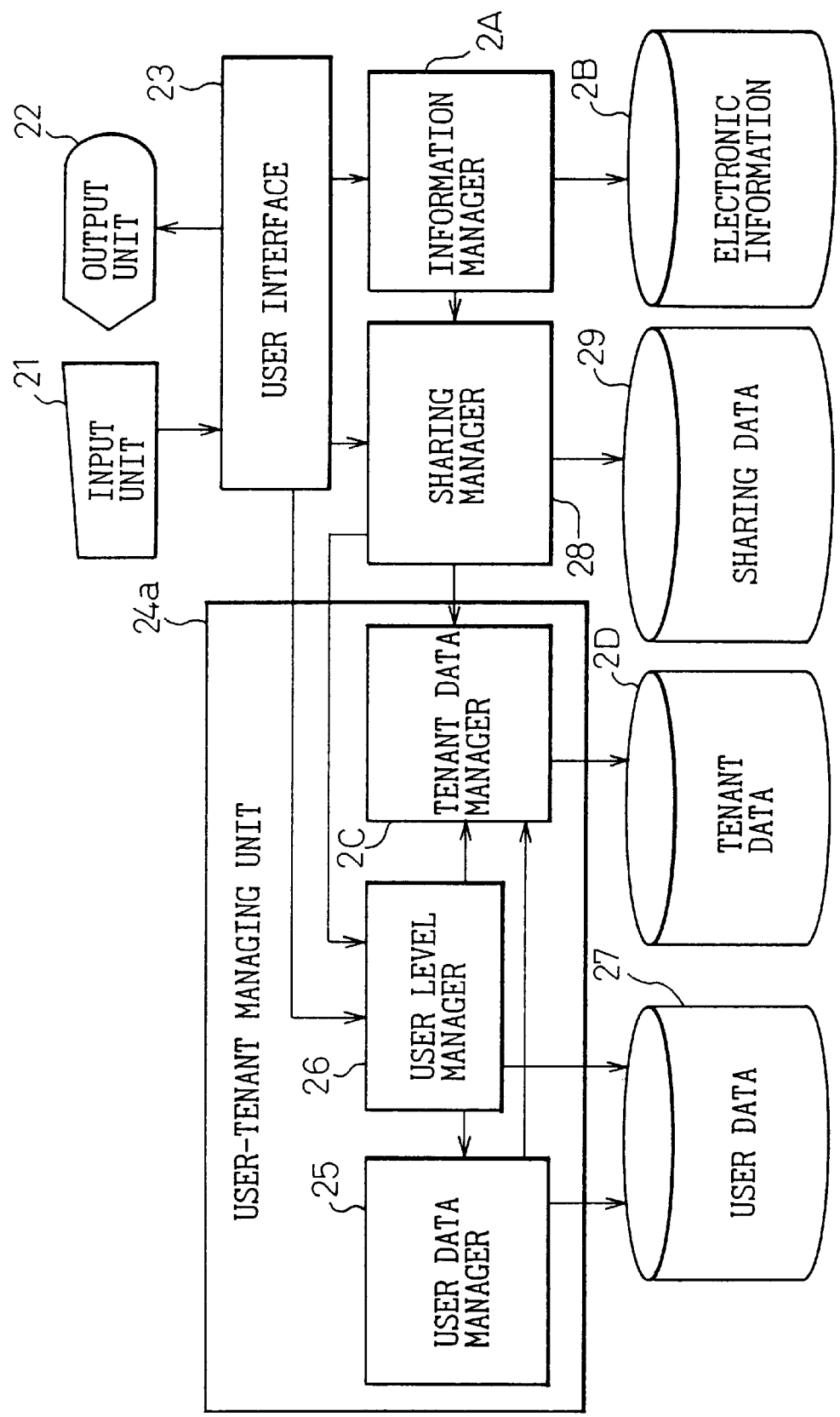
FIG. 3 explains the principle of the present invention.

FIG. 3 shows the principle of the present invention. What is different from the prior art of FIG. 1 is that the present invention additionally has a tenant data manager 2C for managing tenant data 2D. The principle of the present invention will be explained in detail. The elements already explained with reference to FIG. 1 will not be explained again.

a) Request From General User for User List

A requester whose managing level is a general user makes a request for a list of users through an input unit 21. A user interface 23 transfers the request to a user level manager 26 in a user-tenant managing unit 24a. The user level manager 26 recognizes that the requester is a general user according to user data 27 and instructs a user data manager 25 to retrieve a list of users who belong to a tenant to which the requester belongs. The user data manager 25 instructs the tenant data manager 2C to prepare the list. The tenant data manager 2C retrieves necessary data to prepare the list from the tenant data 2D and returns the list to the user data manager 25. The list of users who belong to the tenant to which the requester belongs is transferred to an output unit 22 through the user level manager 26 and user interface 23.

b) Request From System Managing User for Handling User Data or Tenant Data

A requester whose managing level is a system managing user makes a request for registering, updating, or deleting the user data 27 or tenant data 2D through the input unit 21. The user interface 23 transfers the request to the user level manager 26. The user level manager 26 recognizes that the requester is a system managing user according to the user data 27. If the request relates to the user data 27, the user level manager 26 asks the user data manager 25 to handle the request, and if the request relates to the tenant data 2D, the user level manager 26 asks the tenant data manager 2C to handle the request. According to the request, the user data manager 25 or tenant data manager 2C registers, updates, or deletes the user data 27 or tenant data 2D. A result of this is informed to the output unit 22 through the user level manager 26 and user interface 23.

c) Request From Tenant Managing User for Handling User Data or Tenant Data

A requester whose managing level is a tenant managing user makes a request for registering, updating, or deleting the user data 27 or tenant data 2D through the input unit 21. The user interface 23 transfers the request to the user level manager 26. The user level manager 26 recognizes that the requester is a tenant managing user according to the user data 27. If the request relates to data about users who belong to a tenant to which the requester belongs, the user level manager 26 asks the user data manager 25 to handle the request, and if the request relates to data about the tenant to which the requester belongs, the user level manager 26 asks the tenant data manager 2C to handle the request. According to the request, the user data manager 25 or tenant data manager 2C registers, updates, or deletes corresponding part of the user data 27 or tenant data 2D. A result of this is informed to the output unit 22 through the user level manager 26 and user interface 23.

In this way, a request from a general user is accepted by the system of the present invention only when the request is about users who belong to a tenant to which the general user belongs. If a request is made by a system managing user, the present invention accepts the request without regard to users or tenants the request relates to. If a request is made by a tenant managing user, the present invention accepts the request only when the request relates to users who belong to a tenant to which the tenant managing users belongs or when the request relates to the tenant to which the tenant managing user belongs.

(2) Embodiment

Figure 4:
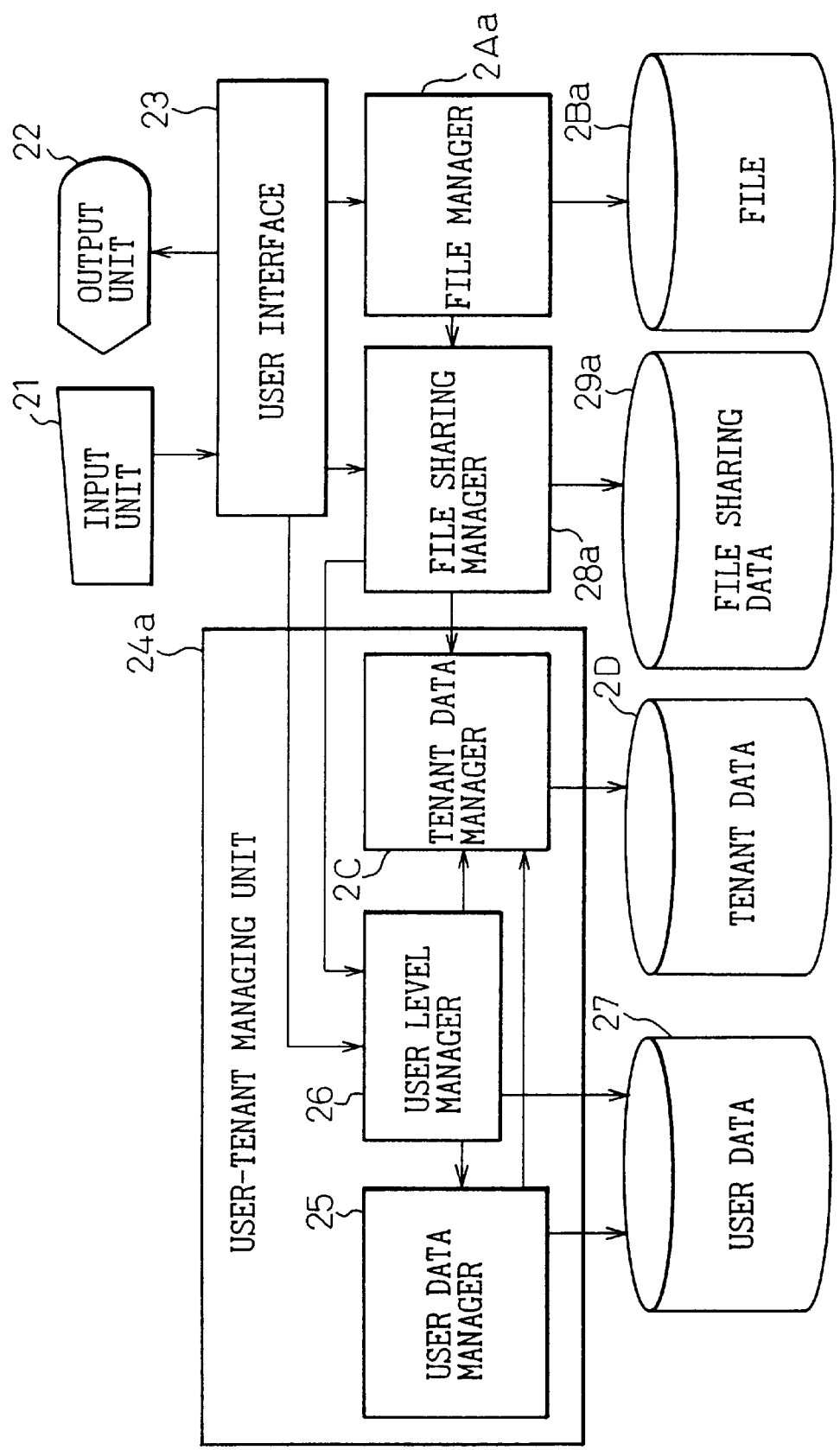
FIG. 4 shows a security system for shared electronic information according to an embodiment of the present invention.
Figure 7:
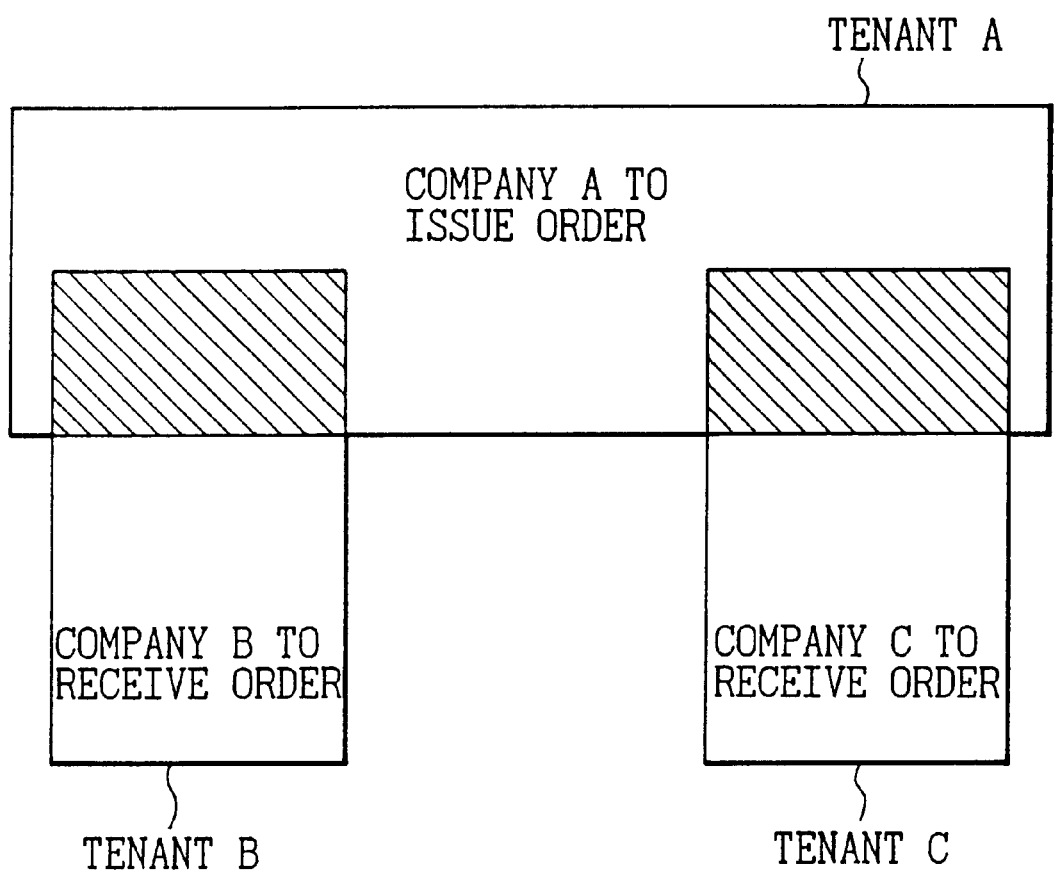
FIG. 7 shows an example of tenant data in the system of FIG. 4.

FIG. 4 shows a security system for shared electronic information according to an embodiment of the present invention. A system managing user is registered in advance in user data 27. Also, tenant data 2D is set in advance. To clearly describe the present invention, the embodiment of FIG. 4 differs from the principle of FIG. 3 in that it employs a file sharing manager 28a instead of the sharing manager 28, file sharing data 29a instead of the sharing data 29, a file manager 2Aa instead of the information manager 2A, and a file 2Ba instead of the electronic information 2B. FIG. 7 shows an example of the tenant data 2D. The tenant data 2D includes a tenant A that is a company A who issues orders, a tenant B that is a company B who receives the orders, and a tenant C that is a company C who receives the orders. The tenants A, B, and C share files and directories. Hatched parts in. FIG. 7 are shared between the tenants A and B, or between the tenants A and C. The remaining parts are not shared among the tenants A, B, and C. The part shared between the tenants A and B is accessible by general users belonging to the tenants A and B and is inaccessible by general users belonging to the tenant C. The part shared between the tenants A and C is accessible by general users belonging to the tenants A and C and is inaccessible by general users belonging to the tenant B.

FIG. 5 shows an example of the user data 27 that indicates the managing level of each user. The user data 27 shows that a user A1 is the system managing user, a user A3 is a tenant managing user, and users A2, B1, C1 are each a general user.

FIG. 6 shows an example of the tenant data 2D that indicates relationships between the tenants and the users. The tenant data 2D shows that the tenant A includes the users A1, A2, and A3, the tenant B includes the users A2, A3, and B1, and the tenant C includes the users A3 and C1.

It is assumed that the user A1 serving as a system managing user and the tenant A are set in advance when the system is constructed. The user A3 serving as a tenant managing user and the users A2, A3, B1, and C1 serving each as a general user are registered. In addition to the names and managing levels of users, personal information such as company names, section names, and telephone numbers related to the users may be held in the user data 27.

a) Tenant Registration by System Managing User

Figure 8:
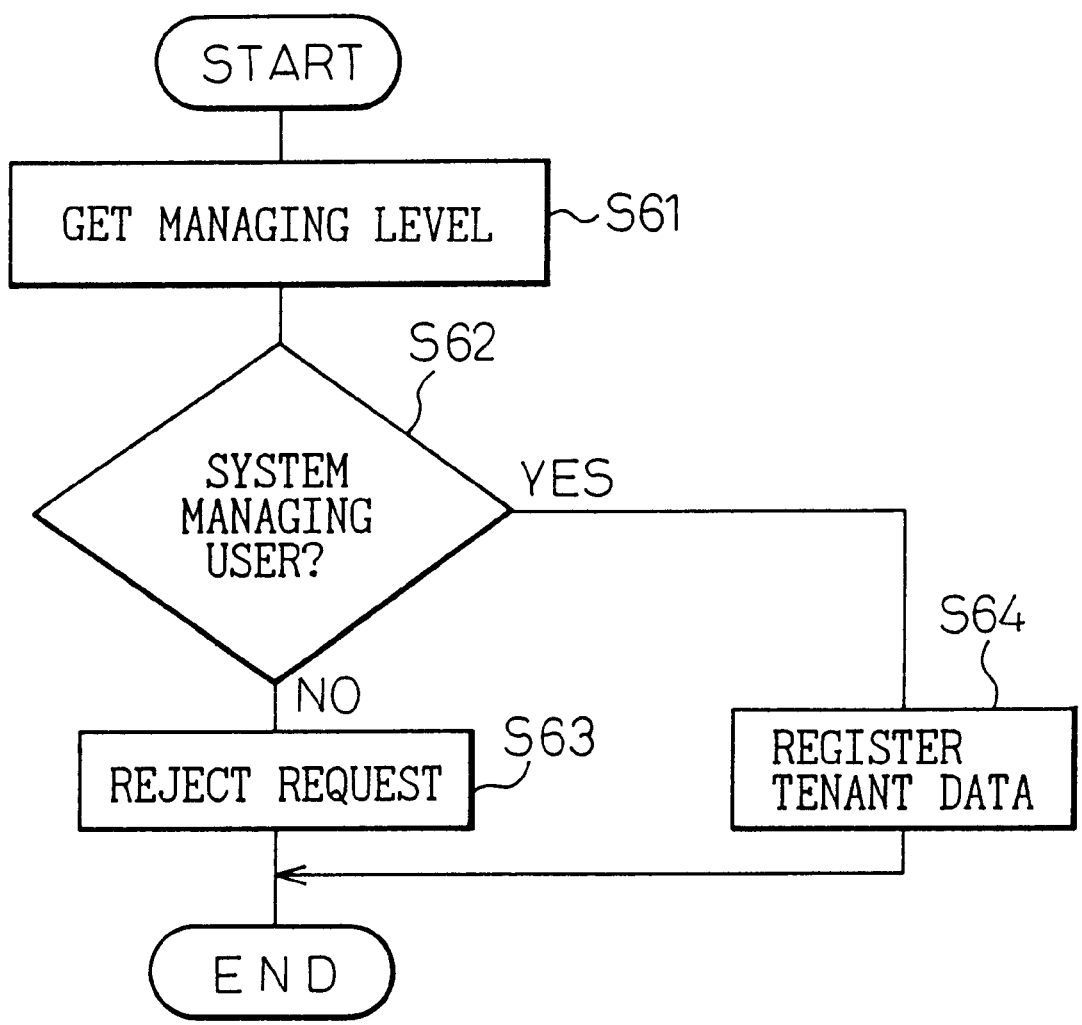
FIG. 8 shows a flow of registering tenants according to the embodiment.

FIG. 8 shows a flow of registering tenants. The details of registration of, for example, a tenant B by the system managing user will be explained.

In step S61, a requester, i.e., the system managing user A1 enters a request for forming the tenant B into the input unit 21. The user interface 23 transfers the request to the user level manager 26 in the user-tenant managing unit 24a. The user level manager 26 recognizes that the managing level of the requester is a system managing user according to the user data 27 (FIG. 5).

Step S62 checks to see if the managing level of the requester is a system managing user. If so, step S64 is carried out, and if not, step S63 is carried out.

Step S64 asks the tenant data manager 2C to prepare the tenant B. The tenant data manager 2C forms the tenant B in a tenant field of the tenant data 2D with no users in the user field of the tenant B. Then, the flow ends.

Step S63 rejects the request because the requester is not a system managing user, and the flow ends.

In this way, steps S61 to S63 allow only a system managing user (A1) to prepare tenants. After a tenant (for example, the tenant B) is prepared, data related to the tenant is updated. This will be explained.

b) Updating Tenant Data

Figure 9:
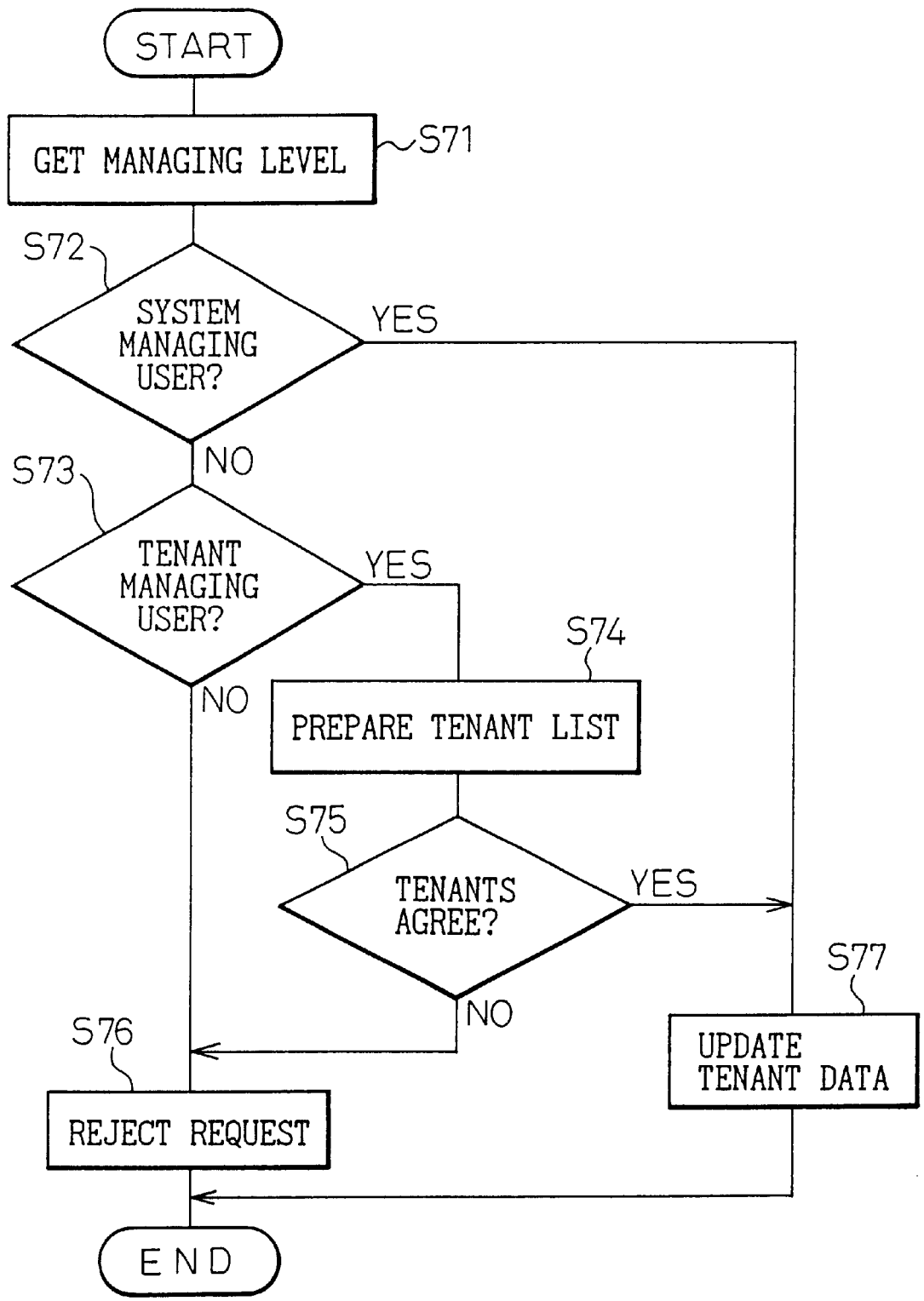
FIG. 9 shows a flow of updating tenant data according to the embodiment.

FIG. 9 shows a flow of updating tenant data. The details of updating tenant data will be explained with reference to FIG. 9.

In step S71, a requester enters a request for updating tenant data into the input unit 21. The user interface 23 transfers the request to the user level manager 26, which acquires the managing level of the requester from the user data 27.

Step S72 checks to see if the managing level of the requester is a system managing user. If so, step S77 is carried out, and if not, step S73 is carried out.

Step S73 checks to see if the managing level of the requester is a tenant managing user. If so, step S74 is carried out, and if not, step S76 is carried out.

Step S74 retrieves a list of tenants to which the requester belongs from the tenant data 2D.

Step S75 checks to see if the tenant to be updated is in the retrieved list of tenants. If it is in the list, step S77 is carried out, and if not, step S76 is carried out.

Step S76 rejects the request, and the flow ends.

Step S77 updates the tenant data 2D according to the request, and the flow ends.

c) Deleting Tenant Data

Figure 10:
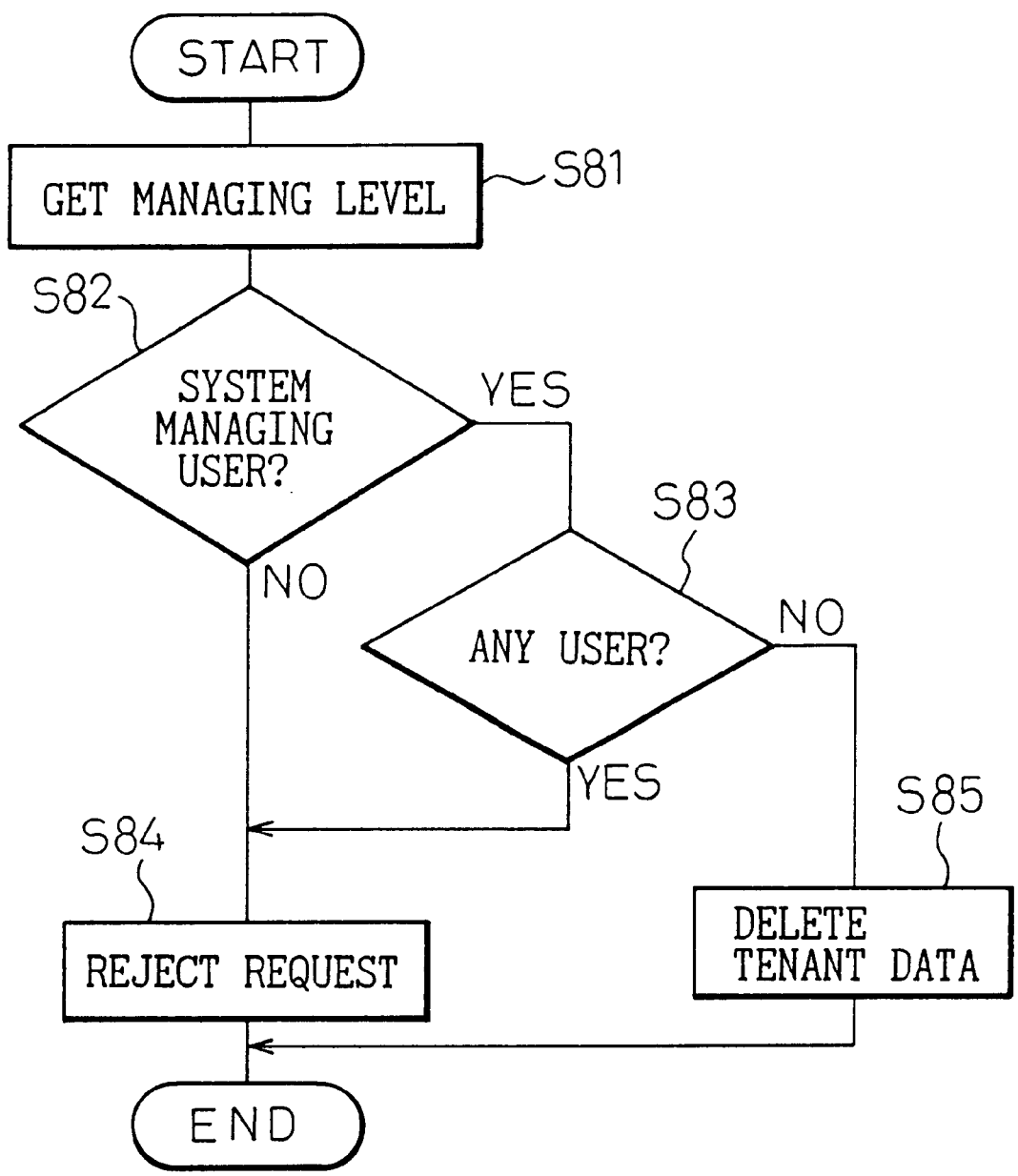
FIG. 10 shows a flow of deleting tenant data according to the embodiment.

FIG. 10 shows a flow of deleting tenant data. The details of deleting tenant data will be explained with reference to FIG. 10.

In step S81, a requester enters a request for deleting tenant data through the input unit 21. The user interface 23 transfers the request to the user level manager 26. The user level manager 26 acquires the managing level of the requester from the user data 27.

Step S82 checks to see if the managing level of the requester is a system managing user. If so, the flow goes to step S83, and if not, to step S84.

Step S83 checks to see if at least one user is set in the tenant to be deleted. If so, the flow goes to step S84, and if not, to step S85.

Step S84 rejects the request and terminates the flow.

Step S85 deletes the tenant data requested by the requester and terminates the flow.

d) Registering User

Figure 11:
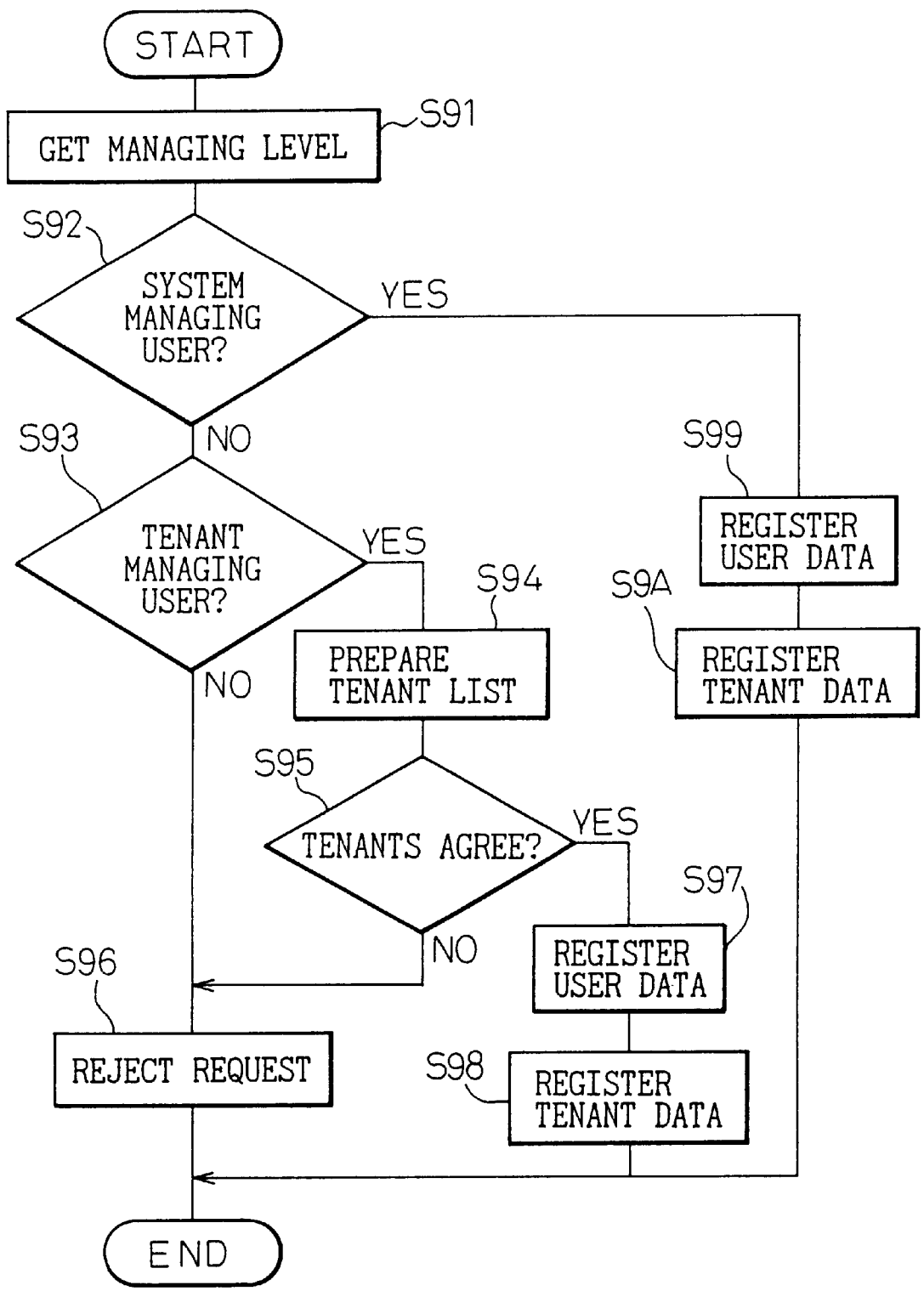
FIG. 11 shows a flow of registering a user according to the embodiment.

FIG. 11 shows a flow of registering a user. The details of registering a user will be explained with reference to FIG. 11.

In step S91 a requester enters a request for registering a user that belongs to a tenant through the input unit 21. The user interface 23 transfers the request to the user level manager 26. The user level manager 26 acquires the managing level of the requester from the user data 27.

Step S92 checks to see if the managing level of the requester is a system managing user. If so, the flow goes to step, S99, and if not, to step S93.

Step S93 checks to see if the requester is a tenant managing user. If so, the flow goes to step S94, and if not, to step S96.

In step S94, the user level manager 26 asks the tenant data manager 2C to prepare a list of tenants to which the requester belongs. The tenant data manager 2C retrieves the list from the tenant data 2D and transfers the list to the user level manager 26.

Step S95 checks to see if the tenant to which the registration requested user is going to be registered is in the list. If it is in the list, the flow goes to step S97, and if not, to step S96.

Step S96 rejects the request and terminates the flow.

Step S97 registers the registration requested user in the user data 27.

Step S98 registers the registration requested user in the tenant data 2D and terminates the flow.

Step S99 registers the registration requested user in the user data 27.

Step S9A registers the registration requested user in the tenant data 2D and terminates the flow.

Through these processes, the registration requested user is registered in the user data 27 and tenant data 2D.

e) Updating User Data

Figure 12:
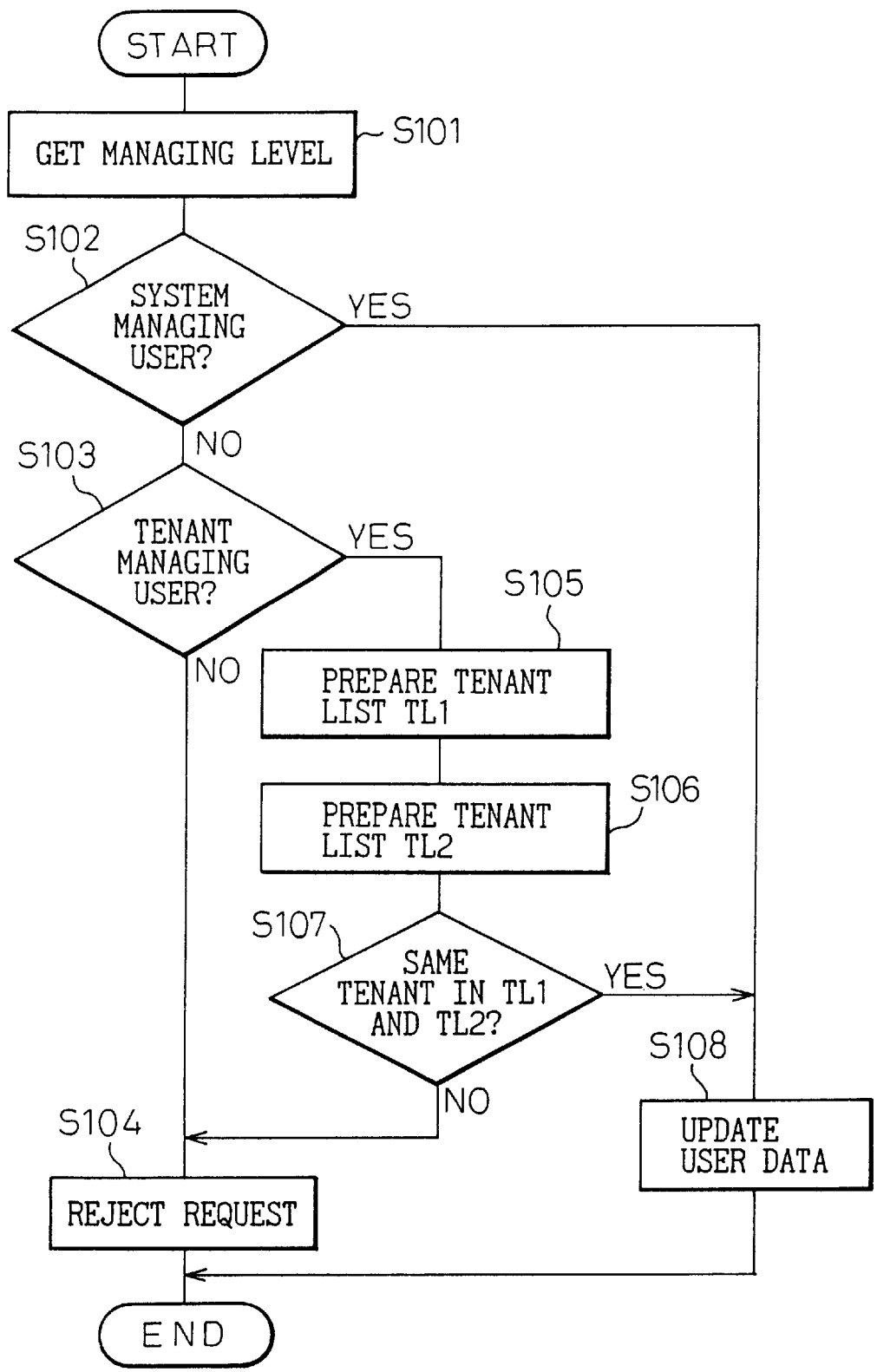
FIG. 12 shows a flow of updating user data according to the embodiment.

FIG. 12 shows a flow of updating user data. The details of updating data about a user belonging to a tenant will be explained with reference to FIG. 12.

In step S101, a requester enters a request for updating data about a user belonging to a specific tenant through the input unit 21. The user interface 23 transfers the request to the user level manager 26, which acquires the managing level of the requester from the user data 27.

Step S102 checks to see if the managing level of the requester is a system managing user. If so, the flow goes to step S108, and if not, to step S103.

Step S103 checks to see if the managing level of the requester is a tenant managing user. If so, the flow goes to step S105, and if not, to step S104.

In step S105, the user level manager 26 asks the tenant data manager 2C to prepare a list of tenants to which the requester belongs. The tenant data manager 2C prepares a list TL1 of tenants from the tenant data 2D and transfers the list TL1 to the user level manager 26.

In step S106, the user level manager 26 asks the tenant data manager 2C to prepare a list of tenants to which the update requested user belongs. The tenant data manager 2C prepares a list TL2 of tenants to which the update requested user belongs from the tenant data 2D and transfers the list TL2 to the user level manager 26.

Step S107 compares the lists TL1 and TL2 with each other. If the same tenant is present in both the lists TL1 and TL2, the flow goes to step S108, and if not, to step S104.

Step S104 rejects the request and terminates the flow.

Step S108 updates data about the update requested user and terminates the flow.

Through these steps, data about the update requested user is updated.

f) Deleting User Data

Figure 13:
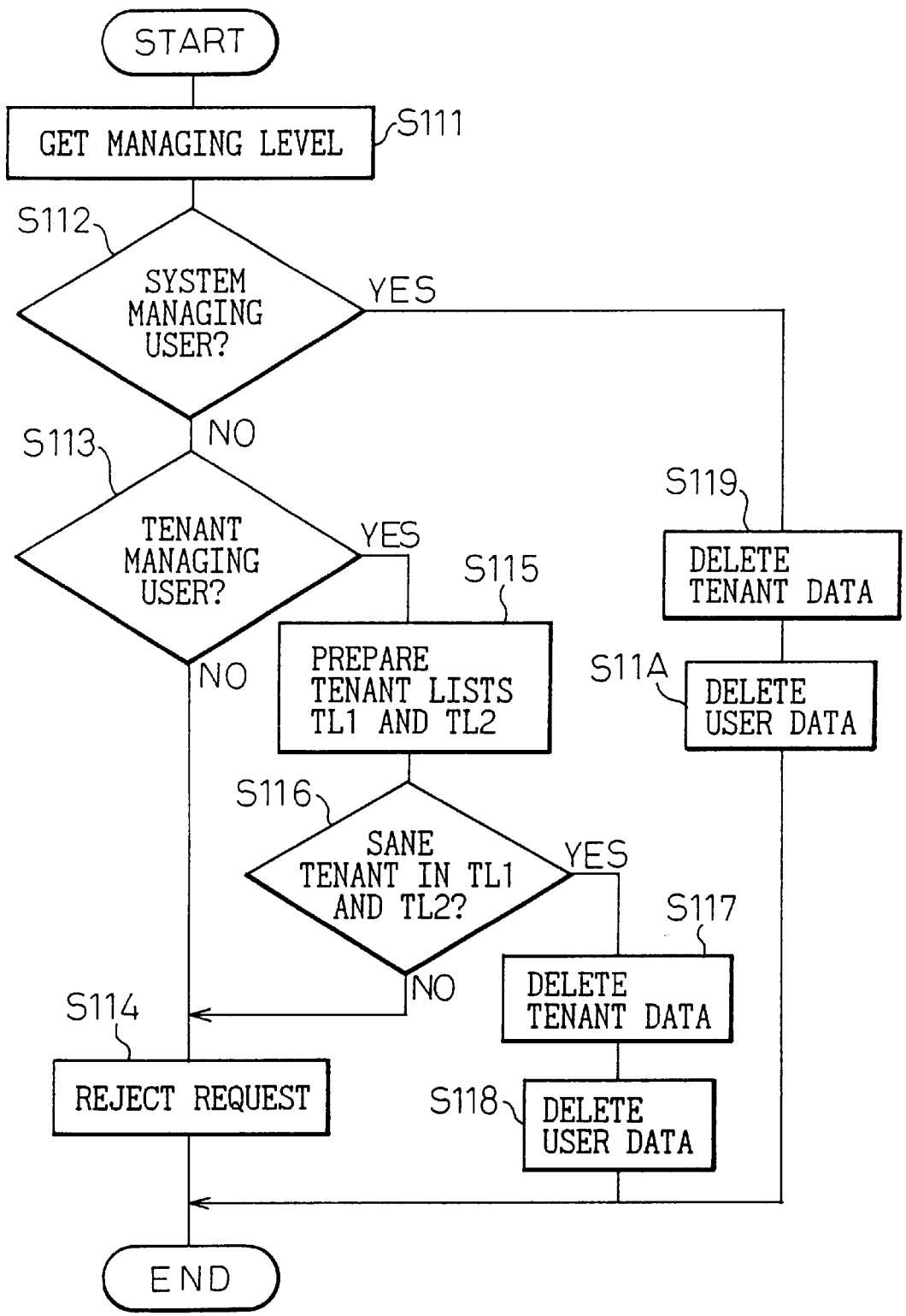
FIG. 13 shows a flow of deleting user data according to the embodiment.

FIG. 13 shows a flow of deleting data about a user. The details of deleting data about a user will be explained with reference to FIG. 13.

In step S111, a requester enters a request for deleting data about a user that belongs to a tenant into the input unit 21. The user interface 23 transfers the request to the user level manager 26. The user level manager 26 acquires the managing level of the requester from the user data 27.

Step S112 checks to see if the managing level of the requester is a system managing user. If so, the flow goes to step S119, and if not, to step S113.

Step S113 checks to see if the requester is a tenant managing user. If so, the flow goes to step S115, and if not, to step S114.

In step S115, the user level manager 26 asks the tenant data manager 2C to prepare a list of tenants to which the requester belongs. The tenant data manager 2C prepares a list TL1 of tenants to which the requester belongs from the tenant data 2D. Thereafter, the user level manager 26 asks the tenant data manager 2C to prepare a list of tenants to which the deletion requested user belongs. The tenant data manager 2C prepares a list TL2 of tenants to which the deletion requested user belongs from the tenant data 2D. The tenant data manager 2C transfers the lists TL1 and TL2 to the user level manager 26.

Step S116 compares the lists TL1 and TL2 with each other. If there is the same tenant in both the lists, the flow goes to step S117, and if not, to step S114.

Step S114 rejects the request and terminates the flow.

Step S117 deletes data about the deletion requested user from the tenant data 2D.

Step S118 deletes data about the deletion requested user from the user data 27, and the flow ends.

Step S119 deletes data about the deletion requested user from the tenant data 2D.

Step S11A deletes data about the deletion requested user from the user data 27, and the flow ends.

Through these steps, data about the deletion requested user is deleted.

g) Setting Sharing Data

An example of sharing a file is shown in FIG. 2 in which the users A2 and B1 share the file a. To share the file a, the user. A2 registers the file a in the sharing data 29 at first. At this time, only the user A2 is allowed to access the file a. The user A2 registers the user B1 as a user that shares the file a in the sharing data 29. As a result, the user B1 is allowed to access the file a. Namely, the present invention does not allows a user who is not registered to share a file. It is possible to set sharing conditions such as a read-only condition and an execute-only condition for each registered user. FIG. 2 shows the sharing states of the file a by the users. A2 and B1 and of other files.

Figure 14:
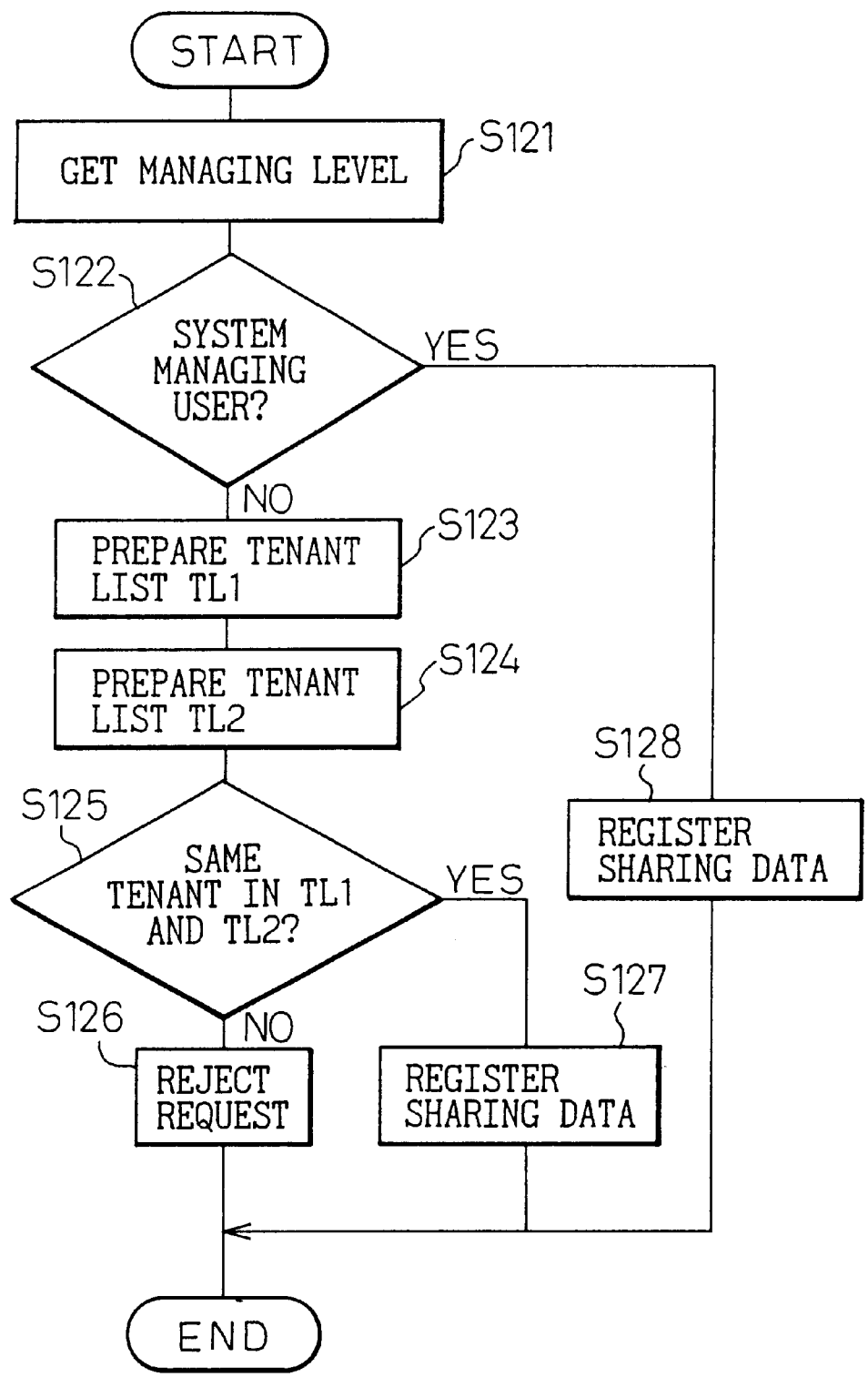
FIG. 14 shows a flow of sharing electronic information according to the embodiment.

FIG. 14 shows a flow of sharing electronic information. The details of sharing a file among users will be explained with reference to FIG. 14.

In step S121, a requester enters a request for sharing a target file with a target user into the input unit 21. The user interface 23 transfers the request to the user level manager 26, which acquires the managing level of the requester from the user data 27.

Step S122 checks to see if the managing level of the requester is a system managing user. If so, the flow branches to step S128, and if not, to step S123.

Step S123 asks the tenant data manager 2C to prepare a list of tenants to which the requester belongs. The tenant data manager 2C prepares a list TL1 to which the requester belongs from the tenant data 2D.

Step S124 asks the tenant data manager 2C to prepare a list of tenants to which the target user belongs. The tenant data manager 2C prepares a list TL2 to which the target user belongs from the tenant data 2D.

Step S125 compares the lists TL1 and TL2 with each other. If there is the same tenant in both the lists TL1 and TL2, the flow branches to step S127, and if not, to step S126.

Step S126 rejects the request and the flow ends.

Step S127 registers the target file and target user in the sharing data 29, and the flow ends.

Step S128 registers the target file and target user in the sharing data 29, and the flow ends.

h) Securing User Data

The processes a) to g) form the tenants A, B, and C as shown in FIGS. 6 and 7, registers the users A1, A2, and A3 in the tenant A and the users A2, A3, and B1 in the tenant B, and the users A3 and C1 in the tenant C as shown in FIG. 6.

Figure 15:
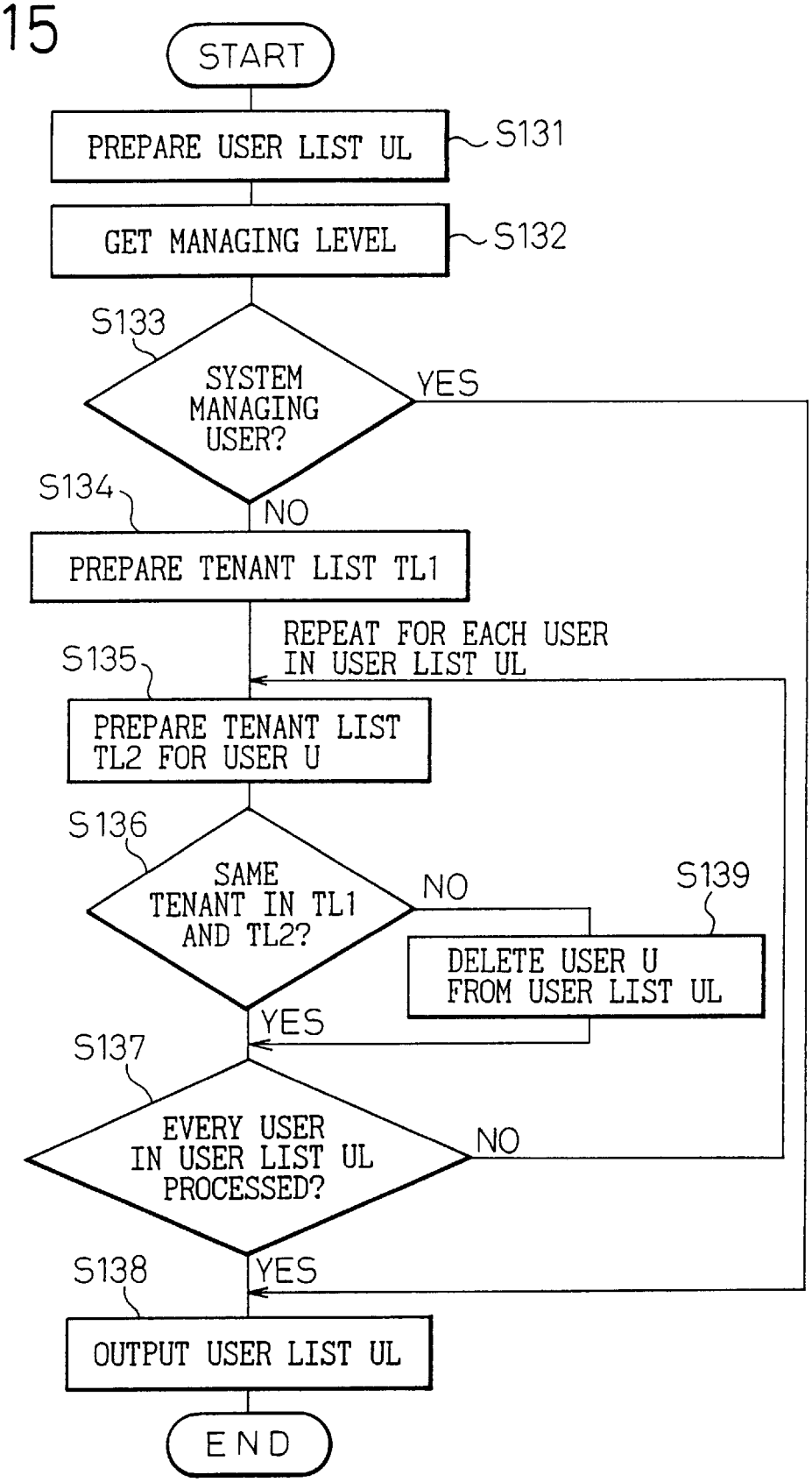
FIG. 15 shows a flow of preparing a list of users that share electronic information according to the embodiment.

FIG. 15 shows a flow of preparing a list of users that share electronic information. The details of ensuring the security of user data with respect to a request for preparing a list of users that share electronic information will be explained with reference to FIG. 15.

In step S131, a requester enters into the input unit 21 a request for acquiring a list of users that share a target file which the requester intends to share. The user interface 23 transfers the request to the file sharing manager 28a. The file sharing manager 28a prepares a list UL of all users that share the target file.

In step S132, the user level manager 26 acquires the managing level of the requester.

Step S133 checks to see if the requester is a system managing user. If so, the flow branches to step S138, and if not, to step S134.

In step S134, the requester is not a system managing user, and therefore, the tenant data manager 2C is asked to prepare a list TL1 of tenants to which the requester belongs. The tenant data manager 2C prepares the list TL1 from the tenant data 2D.

Step S135 picks up a user U from the list UL prepared in step S131 and prepares a list TL2 of tenants to which the user U belongs.

Step S136 compares the lists TL1 and TL2 with each other. If there is the same tenant in both the lists TL1 and TL2, the flow branches to step S137, and if not, to step S139.

Step S137 checks to see if every user in the list UL has been processed. If so, the flow branches to step S138, and if not, to step S135.

Step S138 provides the edited list UL of users to the requester, and the flow ends.

Step S139 deletes the user U from the list UL and goes to step S137.

Through these steps, a general user can obtain data only about users that belong to the tenant to which the general user belongs. Namely, the present invention ensures security that no general user is allowed to obtain data about users who belong to tenants to which the general user does not belong.

Figure 16:
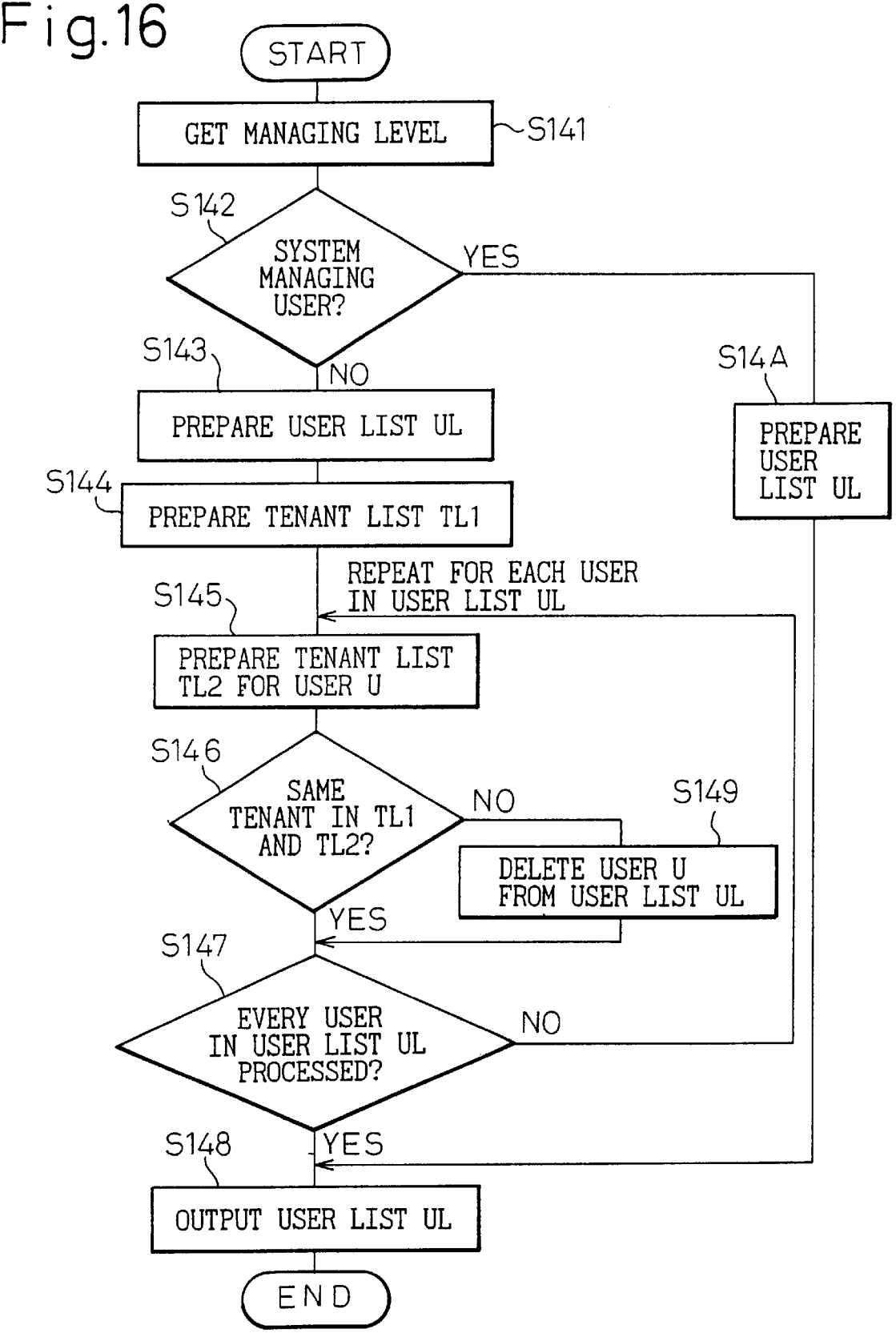
FIG. 16 shows a flow of preparing a list of users that may share electronic information according to the embodiment.

The above explanations relate to the processes of acquiring a list of sharing users according to the name of a shared file specified by a requester. When a requester intends to set a sharing user for a specific file, a list of users that can be referred to is provided, so that the requester selects one of the listed users and sets the user as a sharing user. FIG. 16 shows a flow of editing a list of users that can be referred to. This will be explained in detail.

In step S141, a requester enters a request for a list of users that may share a target file into the input unit 21. The user interface 23 transfers the request to the user level manager 26. The user level manager 26 acquires the managing level of the requester from the user data 27.

Step S142 checks to see if the managing level of the requester is a system managing user. If so, the flow branches to step S14A, and if not, to step S143.

Step S143 prepares a list UL of all users from the user data 27.

Step S144 asks the tenant data manager 2C to prepare a list TL1 of tenants to which the requester belongs.

Step S145 picks up a user U from the list UL and prepares a list TL2 to which the user U belongs.

Step S146 compares the lists TL1 and TL2 with each other. If there is the same tenant in both the lists TL1 and TL2, the flow branches to step S147, and if not, to step S149.

Step S147 checks to see if every user in the list UL has been processed. If so, the flow branches to step S148, and if not, to step S145.

Step S148 returns the edited list UL to the requester, and the flow ends.

Step S149 deletes the user U from the list UL, thereby updating the list UL. Then, the flow goes to step S147.

Step S14A prepares a list UL of all users from the user data 27 and branches to step S148.

(3) Program Stored in Recording Medium Readable by Computer

The processes mentioned above to realize the security system for electronic information sharing according to the present invention are stored as a program in a recording medium that is readable by computer. The program is executed by computer to achieve the processes. The computer-readable recording medium may be a transportable medium such as a CD-ROM (compact disk read only memory), floppy disk, optical disk, EPROM (electrically programmable read only memory), or others. Instead, the program may be stored in a storage device of a computer that is connected to a network and be transferred to another computer through the network. When running the program by a computer, the program is stored in, for example, a hard disk drive of the computer, is loaded to a main memory of the computer, and is executed.

As explained above, the security system for electronic information sharing according to the present invention ensures the security of electronic information by limiting the sharing of user data and electronic information depending on the managing levels of users that may make a request for accessing the user data and electronic information. This system allows the electronic information to be safely shared among users of a plurality of companies through networks.

What is claimed is:

1. A security system for electronic information sharing, having an input terminal with which a requester enters a request for sharing electronic information and an output terminal with which the requester receives a list of users who may share the electronic information, comprising:

sharing data containing electronic information and users who are sharing the electronic information;

tenant data containing tenants and users belonging to the tenants;

user-tenant managing means for retrieving at least a tenant to which the requester belongs from the tenant data and preparing a first list of users who belong to the retrieved tenant from the tenant data; and sharing managing means for comparing the first list with a second list of users who share the electronic information for which the requester made the sharing request, and forming a third list of users who belong both to the first and second lists, and providing the requester with the third list through the output terminal.

2. A security system according to claim 1, further comprising:

user data containing users and managing levels related to the users; and user-tenant managing means for further retrieving a managing level related to the requester from the user data, and if the managing level of the requester indicates that the requester is a system managing user, preparing a list of all users from the user data and providing the requester with the prepared list through the output terminal.

3. A security system according to claim 1, further comprising:

user data containing users and managing levels related to the users; and user-tenant managing means for further retrieving a managing level related to the requester from the user data, and if the managing level of the requester indicates that the requester is a system managing user, allowing the requester to make deletion, updating and addition with respect to the user data.

4. A security system according to claim 1, further comprising:

user data containing users and managing levels related to the users; and user-tenant managing means for further retrieving a managing level related to the requester from the user data, and if the managing level of the requester indicates that the requester is a tenant managing user, retrieving at least a tenant to which the requester belongs from the tenant data, preparing a list of users who belong to the retrieved tenant, and providing the requester with the prepared list through the output terminal.

5. A security system according to claim 1, further comprising:

user data containing users and managing levels related to the users; and user-tenant managing means for further retrieving a managing level related to the requester from the user data, and if the managing level of the requester indicates that the requester is a tenant managing user, allowing the requester to delete, update, and add data about users who belong to a tenant to which the requester belongs.

6. A security system according to claim 1, comprising:

user data containing users and managing levels related to the users; and user-tenant managing means for further retrieving a managing level related to the requester from the user data, and if the managing level of the requester indicates that the requester is a general user, retrieving at least a tenant to which the requester belongs from the tenant data and preparing a first list of users who belong to the retrieved tenant from the tenant data.

7. A computer readable recording medium for storing a security program for electronic information sharing, the program making the computer let a requester enter a request for sharing electronic information through an input terminal and receive a list of users who share the electronic information through an output terminal by providing the computer with the functions of:

setting tenant data containing tenants and users belonging to the tenants;

setting sharing data containing electronic information and users belonging to the tenants;

setting user-tenant managing means for retrieving at least a tenant to which the requester belongs from the tenant data and preparing a first list of users who belong to the retrieved tenant from the tenant data; and setting sharing managing means for comparing the first list with a second list of users who share the electric information for which the requester made the sharing request, and forming a third list of users who belong both to the first and second lists, and providing the requester with the third list through the output terminal.

* * * * *